United States Patent
Lee et al.

(10) Patent No.: US 12,403,805 B2
(45) Date of Patent: Sep. 2, 2025

(54) ARMREST ASSEMBLY OF REAR SEAT FOR VEHICLE

(71) Applicants: Hyundai Motor Company, Seoul (KR); Kia Corporation, Seoul (KR); Hyundai Transys Inc., Seosan-si (KR); Hyundai Ind. Co., Ltd., Ulsan (KR)

(72) Inventors: Tae Hoon Lee, Suwon-si (KR); Ji Hwan Kim, Seoul (KR); Byeong Seon Son, Seoul (KR); Sang Ho Kim, Incheon (KR); Sang Hoon Park, Incheon (KR); Il Hwan Bae, Suwon-si (KR); Jeong Ho Kim, Ulsan (KR); Bong Jae Jeong, Anyang-si (KR); Min Soo Kim, Ulsan (KR)

(73) Assignees: Hyundai Motor Company, Seoul (KR); Kia Corporation, Seoul (KR); Hyundai Transys Inc., Seosan-si (KR); Hyundai Ind. Co., Ltd., Ulsan (KR)

(*) Notice: Subject to any disclaimer, the term of this patent is extended or adjusted under 35 U.S.C. 154(b) by 132 days.

(21) Appl. No.: 18/316,403

(22) Filed: May 12, 2023

(65) Prior Publication Data
US 2024/0149768 A1    May 9, 2024

(30) Foreign Application Priority Data
Nov. 7, 2022  (KR) .................. 10-2022-0147000

(51) Int. Cl.
*B60N 2/75* (2018.01)

(52) U.S. Cl.
CPC .................... *B60N 2/757* (2018.02)

(58) Field of Classification Search
CPC ................ B60N 2/757; B60N 2/763
See application file for complete search history.

(56) References Cited

U.S. PATENT DOCUMENTS

2024/0149767 A1* 5/2024 Lee .............. B60N 2/757

FOREIGN PATENT DOCUMENTS

KR        101363747 B1    2/2014

* cited by examiner

*Primary Examiner* — David R Dunn
(74) *Attorney, Agent, or Firm* — Slater Matsil, LLP

(57) ABSTRACT

An embodiment armrest assembly for a vehicle includes an armrest including a main body and a lid, an armrest board to which the armrest is rotatably coupled and in which the armrest is accommodated in an erect state, and a skirt coupled to a rear bezel housing of the lid and to the armrest board and correspondingly covering a rear space of the lid when the armrest is rotated forward, wherein the skirt has a panel shape and includes a hard material.

20 Claims, 9 Drawing Sheets

ARMREST ASSEMBLY OF REAR SEAT FOR VEHICLE

CROSS-REFERENCE TO RELATED APPLICATIONS

This application claims the benefit of Korean Patent Application No. 10-2022-0147000, filed on Nov. 7, 2022, which application is hereby incorporated herein by reference.

TECHNICAL FIELD

The present disclosure relates to an armrest assembly of a rear seat for a vehicle.

BACKGROUND

An armrest that is rotated forward to use is disposed between the left seat and the right seat in the second row (rear) seat in common passenger cars.

Since the rear portion of the armrest lid is an empty space, a skirt is disposed to the cover the rear portion of the armrest lid when the armrest of a rear seat is rotated forward.

The skirt of a rear seat armrest is unfolded and covers the rear space of the armrest lid when the armrest is rotated forward, and the skirt is folded and stowed when the armrest is erected and accommodated, and the skirts of armrests of the related art are made of a leather material, so there is a defect that when a passenger in a rear seat puts an arm on an armrest, the elbow cannot be supported, and accordingly, the riding comfort is deteriorated.

Further, since it is difficult to sew the sides of leather skirts, there is a defect that the empty space between the sides of the skirt and the board of an armrest is exposed to the outside, which results in deterioration of the external appearance and the feeling of elegance.

The description provided above as background information is just for helping understand the background of embodiments of the present invention and should not be construed as being included in the related art known by those skilled in the art.

SUMMARY

The present disclosure relates to an armrest assembly of a rear seat for a vehicle. Particular embodiments relate to a technology concerning an armrest of a rear seat for a vehicle that can increase the force supporting the elbow when a passenger in a rear seat puts an arm on the armrest because the skirt of the armrest is made of a hard plastic material.

Embodiments of the present invention relate to an armrest assembly of a rear seat for a vehicle and increase the force supporting an elbow of a passenger in a rear seat through a skirt when the passenger puts an arm on the armrest because the skirt of the armrest is made of a hard plastic material, and correspondingly improve riding comfort.

Further, embodiments minimize exposure to the outside of the space between sides of a skirt and an armrest board by covering the space by forming foam portions on the left and right sides of the skirt, and correspondingly improve the feeling of elegance by improving external appearance.

An armrest assembly of a rear seat for a vehicle according to embodiments of the present invention includes an armrest having a main body and a lid, an armrest board to which the armrest is rotatably coupled and in which the armrest is accommodated in an erect state, and a skirt coupled to a rear bezel housing of the lid and the armrest board and correspondingly covering a rear space of the lid when the armrest is rotated forward, wherein the skirt is formed in a panel shape using a hard material.

Front hinges are disposed on a front of the skirt, hinge grooves in which the front hinges are rotatably coupled are formed on the bezel housing, and when the armrest is rotated, the front hinges are rotated in a fastened state to the hinge grooves.

Rear hinges are disposed on left and right sides of a rear of the skirt, guide grooves in which the rear hinges are inserted are formed on inner surfaces of the left and right sides of the armrest board, and when the armrest is rotated, the rear hinges are rotated in an inserted state in the guide grooves and moved along paths of the guide grooves.

The rear hinges include hinge protrusions protruding left and right from the skirt and silicon rubbers coupled to the hinge protrusions in contact with the guide grooves.

Each of the guide groove is formed in an S-shape of which an upper end faces the rear and a lower end faces the front.

Each of the guide grooves includes a curved surface that is concave downward and convex upward.

When the armrest is erected and accommodated in the armrest board, the skirt is erected and disposed between the lid of the armrest and an inner front surface of the armrest board facing the lid.

A foam portion is disposed on the left and right sides of the skirt, and when the armrest has protruded by rotating forward, the foam portions are disposed in the space between the left and right sides of the armrest board and minimize exposure of the inside.

The skirt includes a frame forming the entire shape of the skirt, made of a hard material, and having the foam portions perpendicularly extending on the left and right sides, and an under cover overlapping under the frame and having the front hinges and the rear hinges coupled to the bezel housing and the armrest board.

The skirt further includes an outer cover made of leather and covering and hiding an upper portion of the frame.

The skirt further includes a cushion pad disposed between the frame and the outer cover and generating soft cushioning.

The armrest assembly of a rear seat for a vehicle according to embodiments of the present invention has a configuration in which the skirt that hides the rear space of the lid when the armrest has protruded by rotating forward is made of a plastic material having a hard characteristic, so it has an effect that when a rear seat passenger puts an arm on the armrest, the force of supporting the elbow of the passenger can be increased by the hard skirt, so there is an advantage that riding comfort can be improved.

Further, according to embodiments of the present invention, since the foam portions are formed on the left and right sides of the skirt, when the armrest has protruded by rotating forward, the foam portions of the skirt are disposed in the space between the left and right sides of the armrest board, thereby minimizing exposure of the inside. Accordingly, there is an effect that the external appearance and the feeling of elegance can be improved.

Further, when the armrest is erected and accommodated in the armrest board, the skirt is erected and disposed between the lid of the armrest and an inner front surface of the armrest board facing the lid, so there is an advantage that it is not required to secure a specific accommodation space for the skirt.

BRIEF DESCRIPTION OF THE DRAWINGS

The above and other objects, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Figure 1:
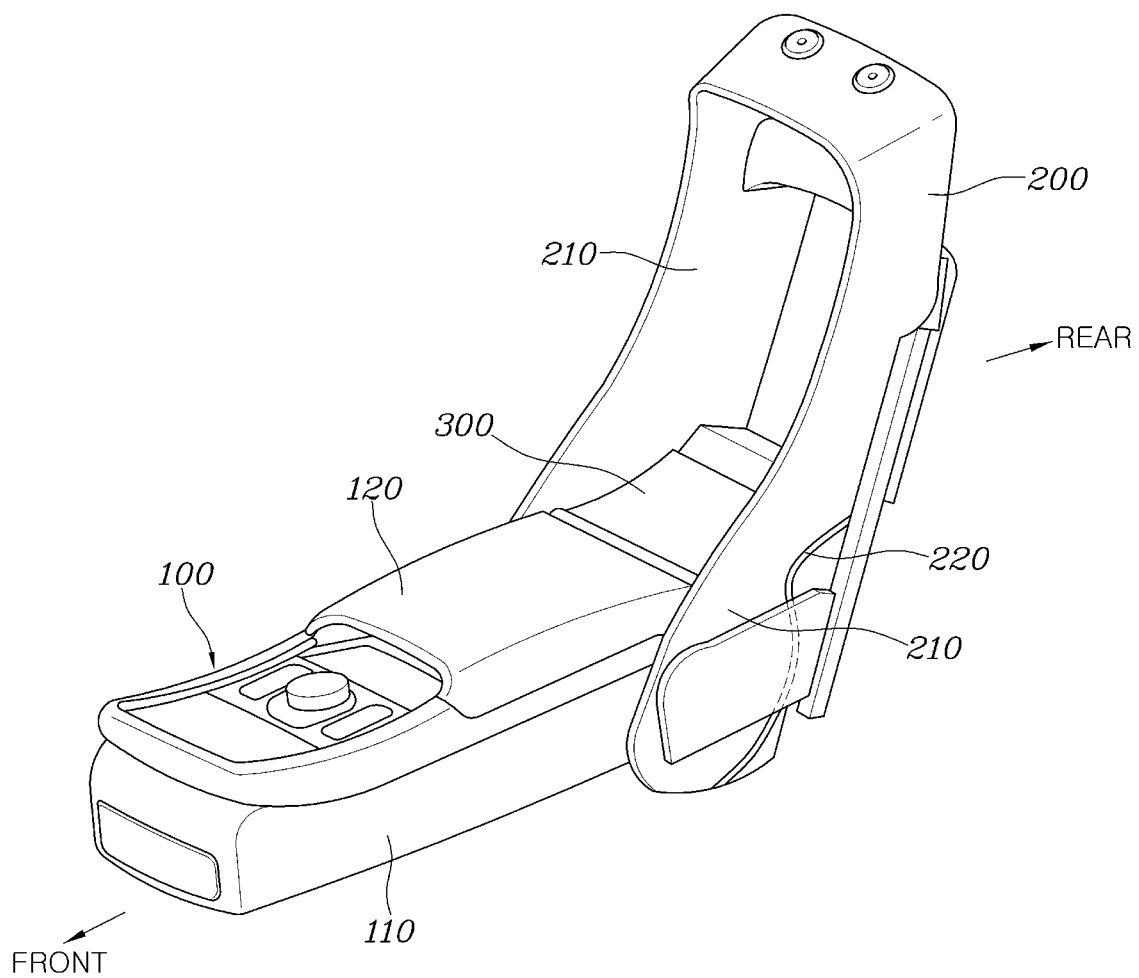
FIG. 1 is a perspective view of an armrest assembly of a rear seat for a vehicle according to an embodiment of the present invention.
Figure 2:
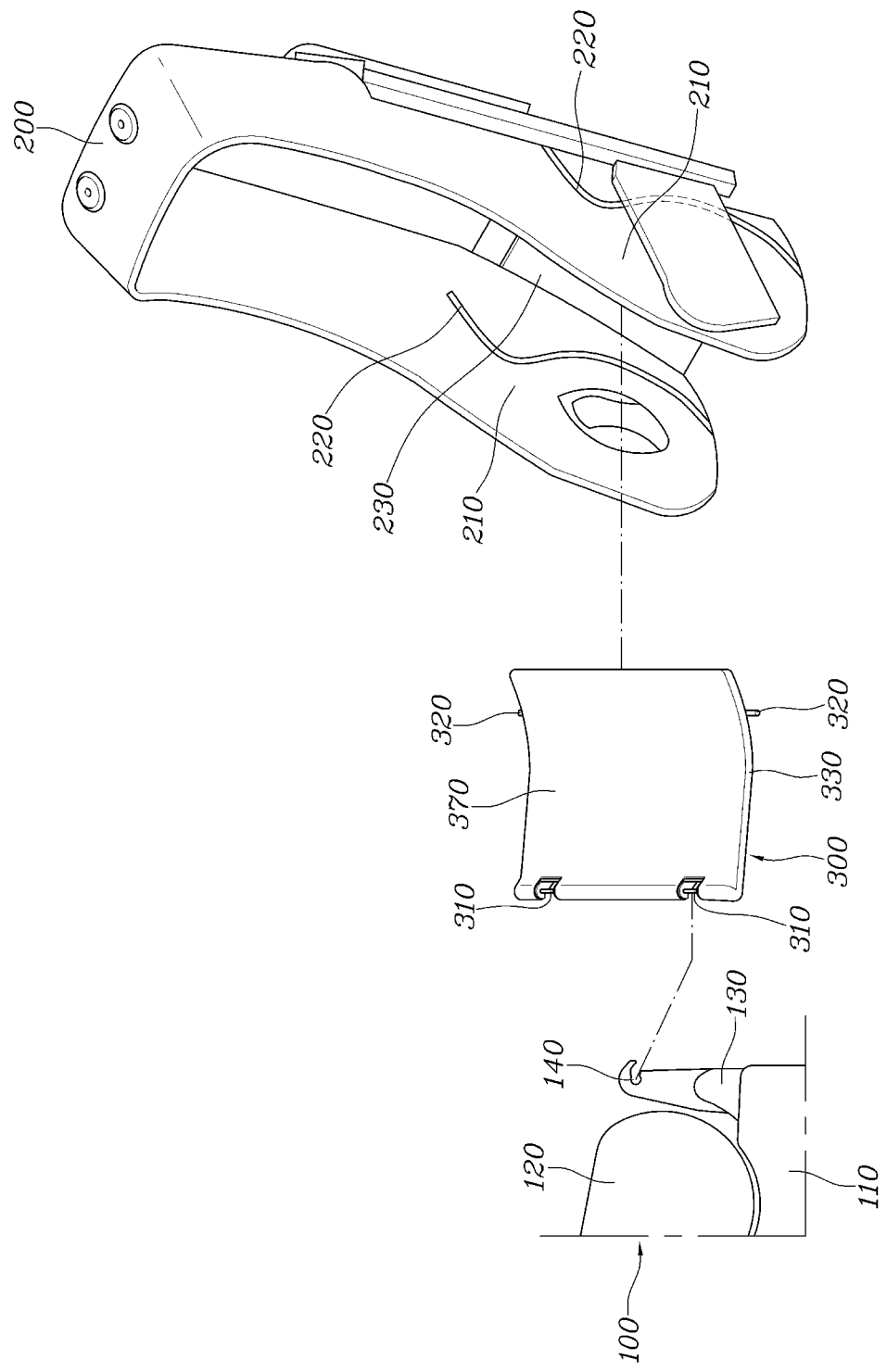
FIGS. 2 to 4 are exploded views of FIG. 1.
Figure 3:
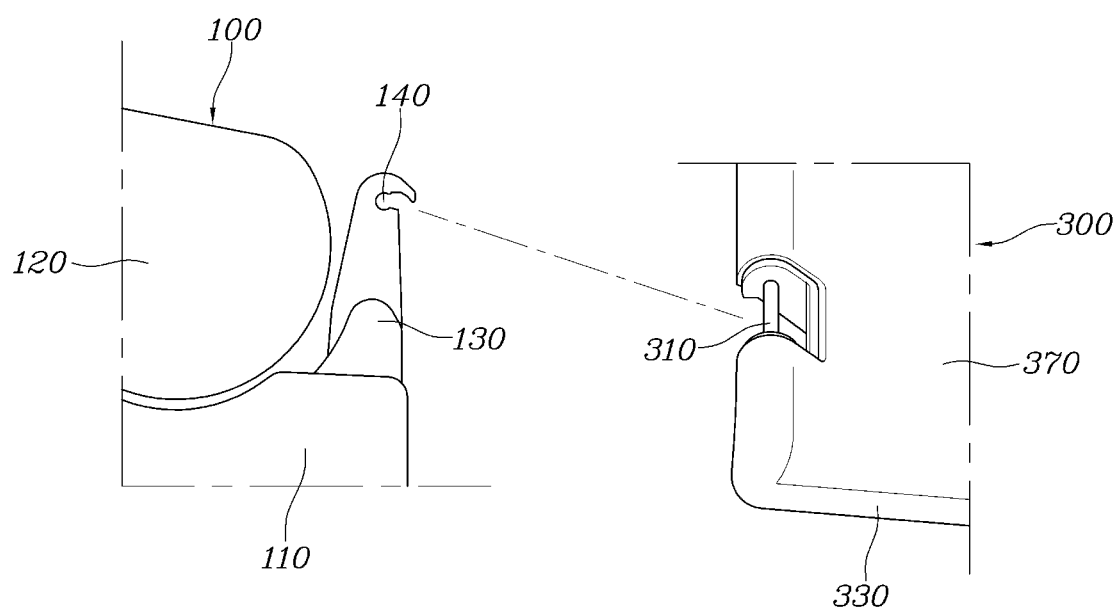
Figure 4:
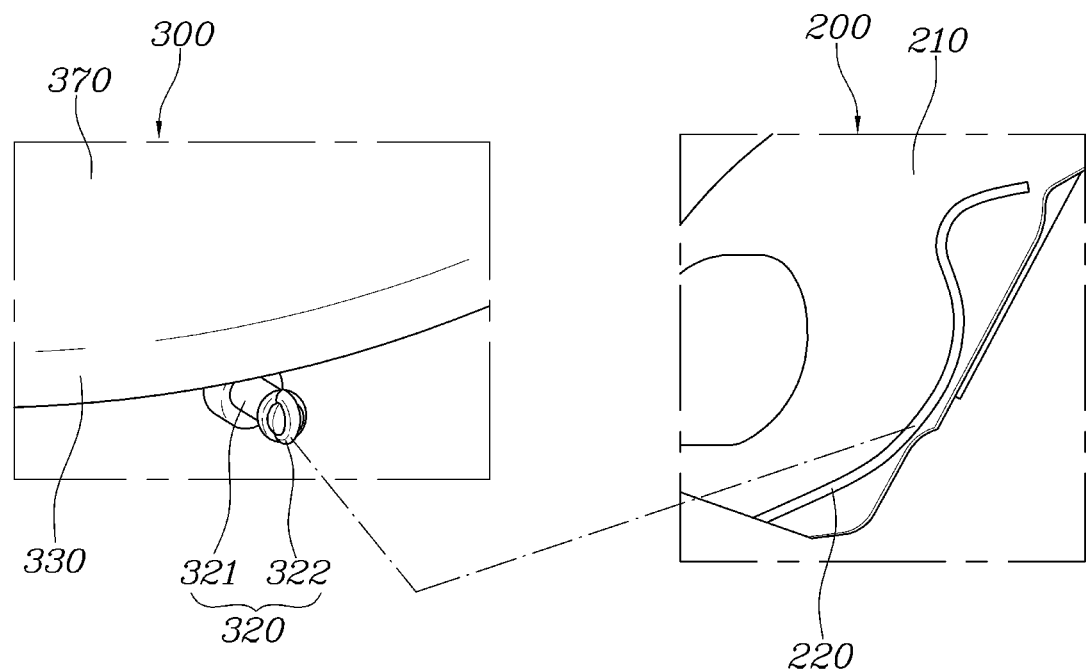

Hereafter, embodiments of the present invention will be described in detail with reference to the accompanying drawings and the same or similar components are given the same reference numerals regardless of the numbers of figures and are not repeatedly described.

The terms "module" and "unit" that are used for components in the following description are used only for the convenience of description without having discriminate meanings or functions.

In the following description, if it is decided that the detailed description of known technologies related to embodiments of the present invention makes the subject matter of the embodiments described herein unclear, the detailed description is omitted.

Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present invention.

Terms including ordinal numbers such as "first", "second", etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween.

On the other hand, it should be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

A unit or a control unit included in names such as a motor control unit (MCU) and a hybrid control unit (HCU) is only a term that is generally used to name a controller that controls specific functions of a vehicle rather than meaning a generic function unit.

A controller may include a communication device that communicates with another controller or a sensor to control corresponding functions, a memory that stores an operating system or logic commands and input/output information, and one or more processors that perform determination, calculation, decision, etc. for controlling the corresponding functions.

An armrest assembly of a rear seat for a vehicle according to exemplary embodiments of the present invention is described hereafter in detail with reference to the accompanying drawings.

An armrest assembly of a rear seat for a vehicle according to embodiments of the present invention, as shown in FIGS. 1 to 9, includes an armrest 100 having a main body no and a lid 120, an armrest board to which the armrest 100 is rotatably coupled and in which the armrest 100 is accommodated in an erect state, and a skirt 300 coupled to a rear bezel housing 130 of the lid 120 and the armrest board 200 and correspondingly covering a rear space of the lid 120 when the armrest 100 is rotated forward.

The rear seat of common passenger cars includes a left seat and a right seat, and an armrest 100 that is rotated forward for use by a rear seat passenger is disposed between the left seat and the right seat.

The armrest 100 includes the main body no accommodating and storing articles, the lid 120 rotatably coupled to the main body no, and the bezel housing 130 connected to the main body no and protruding upward from the rear of the lid 120.

The armrest board 200 is fixed to a rear seat and an end of the armrest 100 is rotatably coupled to the armrest board 200.

The armrest board 200 has left and right sides 210, so the armrest 100 is accommodated in an erect state in the space between the sides 210.

The skirt 300 is hinged at the front to the bezel housing 130 and is coupled at both sides to the armrest board 200, and accordingly, the skirt 300 is operated together when the armrest 100 is rotated.

When the armrest 100 is rotated forward to protrude, the rear space of the lid 120 is hidden by the skirt 300, so the external appearance is improved.

Further, the skirt 300 according to embodiments of the present invention is formed in a panel shape using a hard material, so when a rear seat passenger puts an arm on the armrest 100, the elbow of the passenger is supported by the skirt 300, whereby riding comfort can be improved. As such, a hard material is a material that has a resistance to surface deformation sufficient to support a passenger's elbow. For example, the hard material has a hardness to support at least 20 pounds.

It is preferable that the skirt 300 according to embodiments of the present invention, for example, is made of a plastic material through injection molding to have a hard characteristic, but is not limited thereto.

A front hinge 310 is disposed on the front of the skirt 300 and a hinge groove 140 in which the front hinge 310 is rotatably coupled is formed on the bezel housing 130, so when the armrest 100 is rotated, the front hinge 310 is rotated in the fastened state to the hinge groove 140.

Two front hinges 310 extending left and right and having a circular cross-section is spaced left and right apart from each other on the front of the skirt 300, and arc-shaped hinge grooves 140 rotatably coupled to the two front hinges 310, respectively, are formed on the bezel housing 130.

When the armrest 100 is rotated with respect to the armrest board 200, the front hinges 310 are rotated in the fastened state to the hinge grooves 140, and accordingly, when the armrest 100 is rotated, the skirt 300 is rotated together with the bezel housing 130.

Rear hinges 320 are disposed on the left and right sides of the rear of the skirt 300 and guide grooves 220 in which the rear hinges 320 are inserted are formed on the inner surfaces of the left and right sides 210 of the armrest board 200, so when the armrest 100 is rotated, the rear hinges 320 are rotated in the inserted state in the guide grooves 220 and moved along the paths of the guide grooves 220.

The rear hinges 320 protrude left and right from left and right sides of the skirt 300 spaced rearward apart from the front hinge 310, and the guide grooves 220 that are curved are formed on the inner surfaces of the sides 210 of the armrest board 200, so the rear hinges 320 are inserted in the guide grooves 220.

When the armrest 100 is rotated with respect to the armrest board 200, the front hinges 310 are rotated in the fastened state to the hinge grooves 140 and the skirt 300 is moved together with the bezel housing 130, and in this case, the rear hinges 320 are rotated and moved along the paths of the guide grooves 220 in the inserted state in the guide grooves 220.

The rear hinges 320 include hinge protrusions 321 protruding left and right from the skirt 300 and silicon rubbers 322 coupled to the hinge protrusions 321 in contact with the guide grooves 220.

The hinge protrusions 321 are protrusions having strength and rigidity as protrusions forming the frames of the rear hinges 320, and the silicon rubbers 322 coupled to the hinge protrusions 321 offset a friction with the guide grooves 220 in contact with the guide grooves 220 when the rear hinges 320 are rotated and moved, thereby serving to enable the rear hinges 320 to freely move.

The guide grooves 220 formed on the armrest board 200 are formed in S-shapes of which the upper end faces the rear and the lower end faces the front.

The guide grooves 220 may have a structure including a curved surface that is concave downward and convex upward.

Figure 7:
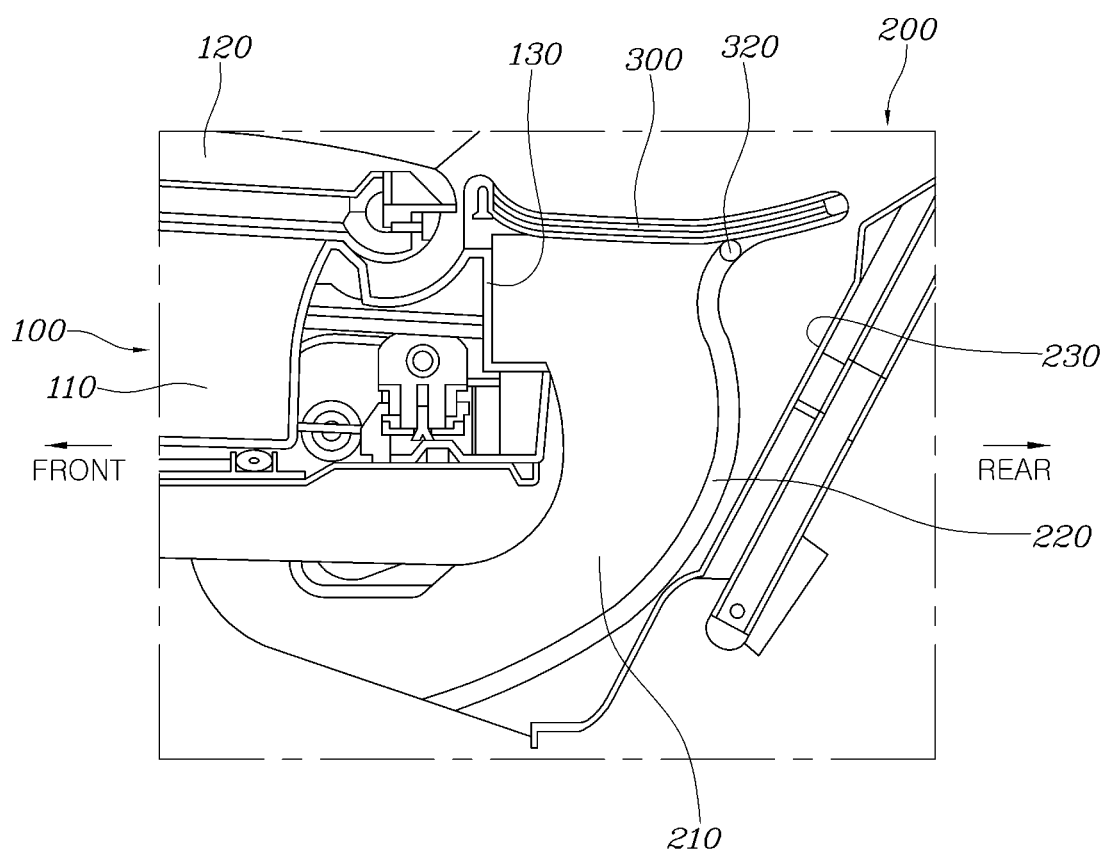
FIGS. 7 to 9 are operation views of the armrest assembly according to embodiments of the present invention.
Figure 8:
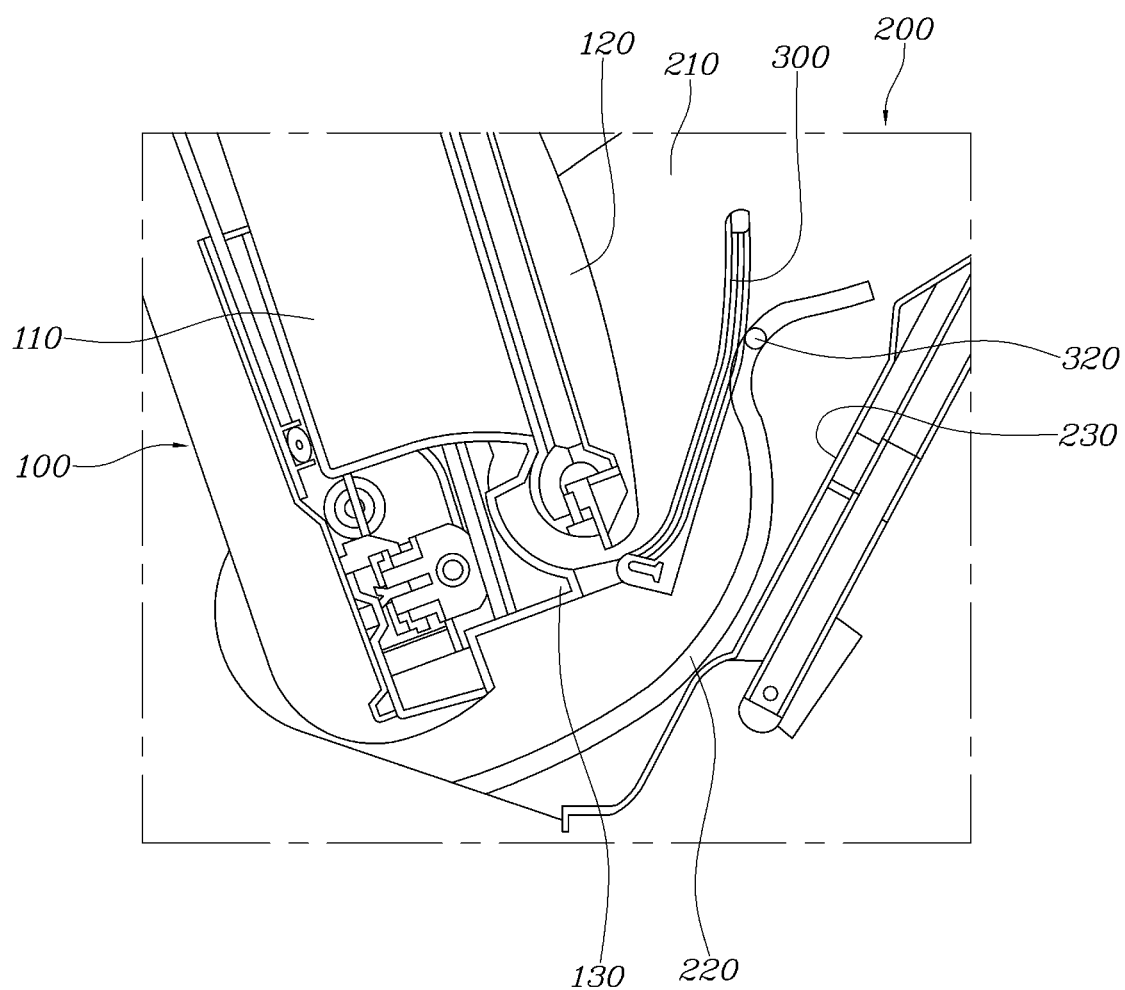

Accordingly, when the armrest 100 rotates forward and protrudes, the skirt 300, as shown in FIG. 7, is disposed to extend in the front-rear direction and hides the rear space of the lid 120 of the armrest 100, so external appearance can be improved.

Further, when a passenger in a rear seat puts an arm on the armrest 100 rotated forward, the elbow of the passenger is supported in contact with the skirt 300 extending forward and rearward. Accordingly, the skirt 300 according to embodiments of the present invention is made of a plastic material to have a hard characteristic and can support the elbow of the passenger with sufficient rigidity, so riding comfort can be improved.

Figure 9:
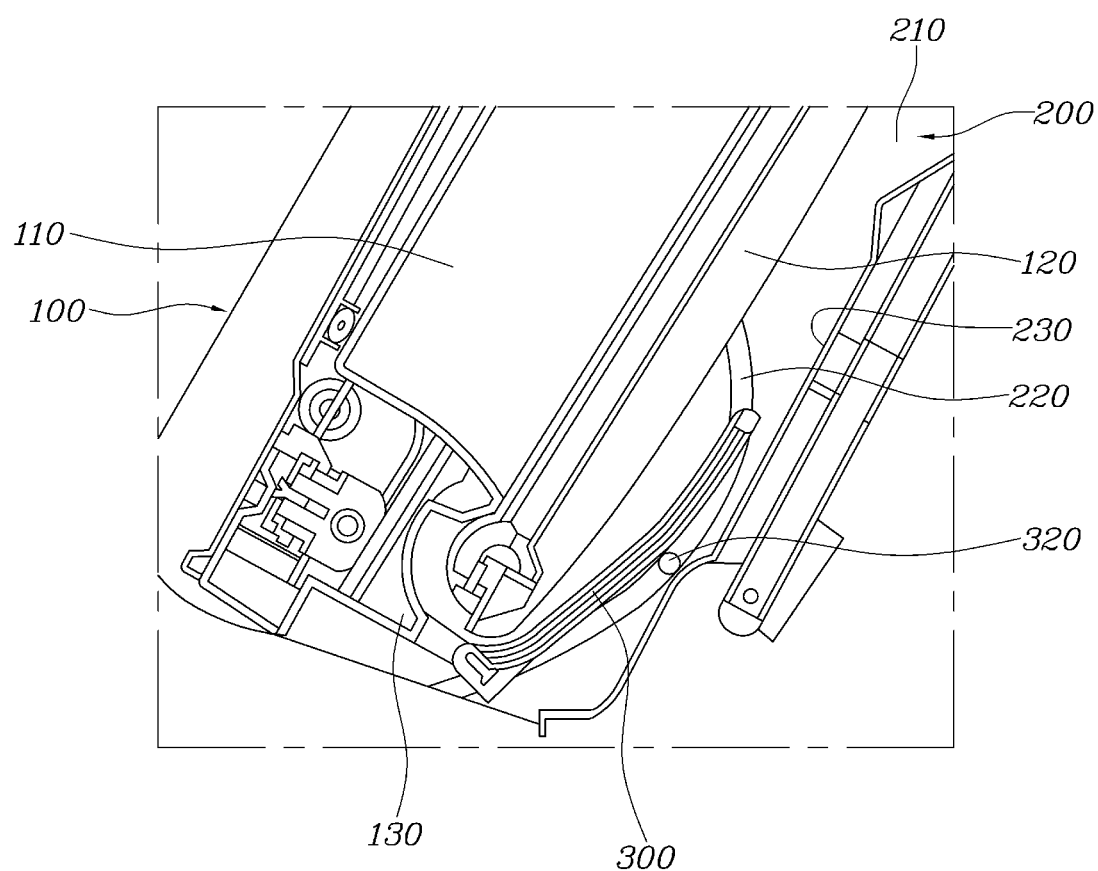

Since the guide grooves 220 formed on the armrest board 200 are formed in S-shapes, as in FIG. 9, when the armrest 100 is erected and accommodated in the armrest board 200, the skirt 300 is erected and disposed between the lid 120 of the armrest 100 and an inner front surface 230 of the armrest board 200 facing the lid 120, so there is an advantage that it is not required to secure a specific accommodation space for the skirt 300.

A foam portion 330 extending downward perpendicular to the top of the skirt 300 is disposed on the left and right sides of the skirt 300.

Figure 5:
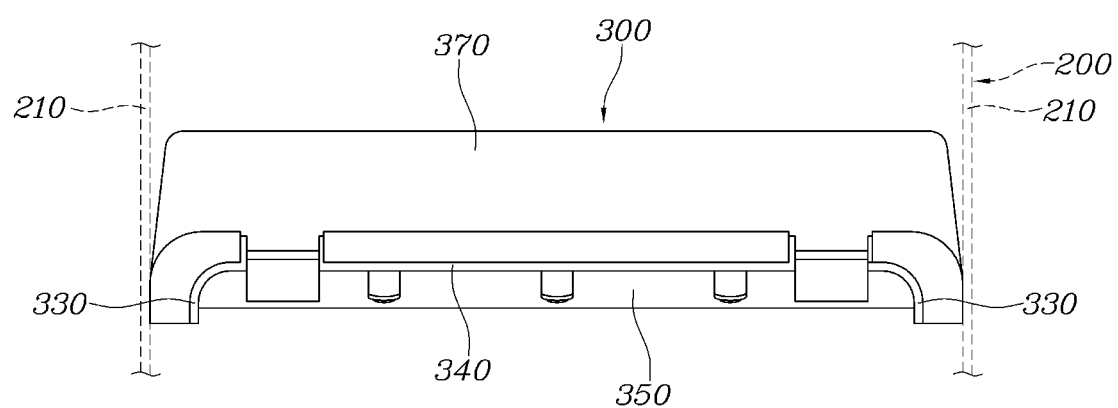
FIG. 5 is a front view of a skirt.
Figure 6:
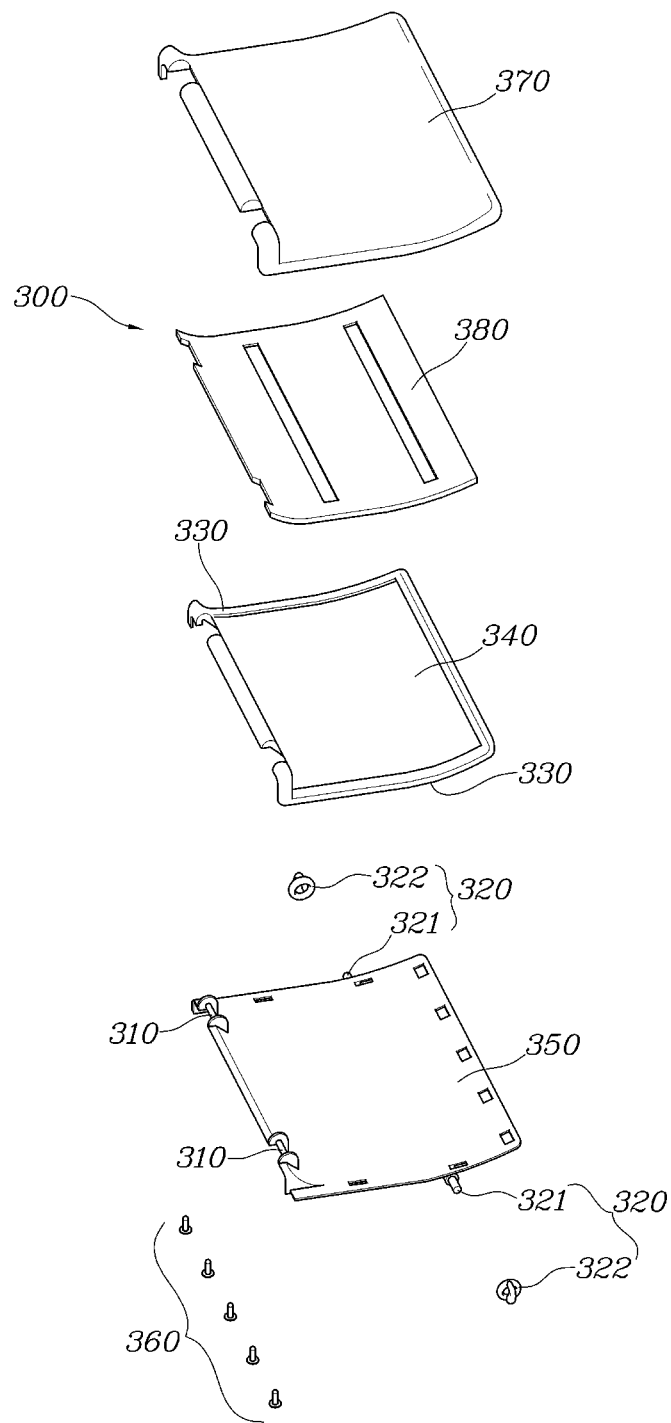
FIG. 6 is an exploded view of a skirt.

When the armrest 100 has protruded by rotating forward, the foam portions 330 of the skirt 300, as in FIG. 5, are disposed in the space between the left and right sides 210 of the armrest board 200 and minimize exposure of the inside, so the external appearance can be improved.

The skirt 300 according to embodiments of the present invention includes a frame 340 forming the shape of the skirt, made of a hard material, and having the foam portions 33o perpendicularly extending on the left and right sides, and an under cover 350 overlapping under the frame 340 and having the front hinges 310 and the rear hinges 320 coupled to the bezel housing 130 and the armrest board 200.

The frame 340 is manufactured through injection molding using a plastic material having a hard characteristic and functions as a frame supporting the entire shape of the skirt 300, and the under cover 350 has the front hinges 310 and the rear hinges 320 and functions as a body for operating the skirt 300.

The frame 340 and the under cover 350 are coupled and integrated by several fasteners 360 such as bolts or screws.

The skirt 300 according to embodiments of the present invention further includes an outer cover 370 made of leather and covering and hiding the upper portion of the frame 340 and a cushion pad 380 disposed between the frame 340 and the outer cover 370 and generating soft cushioning.

The outer cover 370 is made of leather and covers the outer surface (top) of the skirt 300, thereby increasing the feeling of elegance and hiding the inside of the skirt 300. It is preferable that the cushion pad 380 is made of any one of a foam material, rubber, or a sponge to remove a sense of difference when coming in contact with a passenger, but is not limited thereto.

As described above, since the armrest assembly of a rear seat for a vehicle according to embodiments of the present invention has a configuration in which the skirt 300 that hides the rear space of the lid 120 when the armrest 100 has protruded by rotating forward is made of a plastic material having a hard characteristic, when a rear seat passenger puts an arm on the armrest 100, the force of supporting the elbow of the passenger can be increased by the skirt 300, so there is an advantage that riding comfort can be improved.

Further, according to embodiments of the present invention, since the foam portions 330 are formed on the left and right sides of the skirt 300, when the armrest 100 has protruded by rotating forward, the foam portions 330 of the skirt 300 are disposed in the space between the left and right sides 210 of the armrest board 200, thereby minimizing exposure of the inside. Accordingly, there is an advantage that the external appearance and the feeling of elegance can be improved.

Further, when the armrest 100 is erected and accommodated in the armrest board 200, the skirt 300 is erected and disposed between the lid 120 of the armrest 100 and an inner front surface 230 of the armrest board 200 facing the lid 120, so there is an advantage that it is not required to secure a specific accommodation space for the skirt 300.

Although the present invention was described with reference to specific embodiments shown in the drawings, it is apparent to those skilled in the art that the present invention may be changed and modified in various ways without departing from the scope of the present invention which is described in the following claims.

What is claimed is:

1. An armrest assembly for a vehicle, the armrest assembly comprising:
   an armrest comprising a main body and a lid;
   an armrest board to which the armrest is rotatably coupled and in which the armrest is accommodated in an erect state;
   a skirt coupled to a rear bezel housing of the lid and to the armrest board and correspondingly covering a rear space of the lid when the armrest is rotated forward, wherein the skirt has a panel shape and comprises a hard material; and foam portions disposed on left and right sides of the skirt, wherein when the armrest is in a protruded state after rotating forward, the foam portions are disposed in a space between left and right sides of the armrest board and minimize exposure of an inside region.

2. The armrest assembly of claim 1, further comprising: front hinges disposed on a front of the skirt; and hinge grooves in which the front hinges are rotatably coupled, the hinge grooves being disposed on the rear bezel housing, wherein when the armrest is rotated, the front hinges are rotated in a fastened state to the hinge grooves.

3. The armrest assembly of claim 1, further comprising: rear hinges disposed on left and right sides of a rear of the skirt; and guide grooves in which the rear hinges are inserted, the guide grooves being disposed on inner surfaces of the left and right sides of the armrest board, wherein when the armrest is rotated, the rear hinges are rotated in an inserted state in the guide grooves and moved along paths of the guide grooves.

4. The armrest assembly of claim 3, wherein the rear hinges comprise:

hinge protrusions protruding left and right from the skirt; and silicon rubbers coupled to the hinge protrusions in contact with the guide grooves.

5. The armrest assembly of claim 3, wherein each of the guide grooves has an S-shape of which an upper end faces a rear end of the vehicle and a lower end faces a front end of the vehicle.

6. The armrest assembly of claim 3, wherein each of the guide grooves comprises a curved surface that is concave downward and convex upward.

7. The armrest assembly of claim 1, wherein when the armrest is erect and accommodated in the armrest board, the skirt is erect and disposed between the lid of the armrest and an inner front surface of the armrest board facing the lid.

8. The armrest assembly of claim 1, wherein the skirt comprises:

a frame defining a shape of the skirt, wherein the frame comprises a second hard material and wherein the foam portions extend perpendicularly on the left and right sides of the skirt; and an under cover overlapping under the frame and having front hinges and rear hinges coupled to the rear bezel housing and the armrest board.

9. An armrest assembly for a vehicle, the armrest assembly comprising:

an armrest comprising a main body and a lid;

an armrest board to which the armrest is rotatably coupled and in which the armrest is accommodated in an erect state; and a skirt coupled to a rear bezel housing of the lid and to the armrest board and correspondingly covering a rear space of the lid when the armrest is rotated forward, wherein the skirt has a panel shape and is comprised of a first hard material, wherein the skirt comprises:

a frame defining a shape of the skirt, wherein the frame comprises a second hard material and foam portions perpendicularly extending on left and right sides of the skirt; and an under cover overlapping under the frame and having front hinges and rear hinges coupled to the rear bezel housing and to the armrest board.

10. The armrest assembly of claim 9, wherein the skirt further comprises an outer cover comprising leather and covering and hiding an upper portion of the frame.

11. The armrest assembly of claim 10, wherein the skirt further comprises a cushion pad disposed between the frame and the outer cover and configured to provide soft cushioning.

12. A method of operating an armrest assembly for a vehicle, the method comprising:

rotatably coupling an armrest to an armrest board in which the armrest is accommodated when in an erect state, the armrest comprising a main body and a lid;

coupling a skirt to a rear bezel housing of the lid and to the armrest board and correspondingly covering a rear space of the lid when the armrest is rotated forward, wherein the skirt has a panel shape and comprises a hard material; and disposing foam portions on left and right sides of the skirt, wherein when the armrest is in a protruded state after rotating forward, the foam portions are disposed in a space between left and right sides of the armrest board and minimize exposure of an inside region.

13. The method of claim 12, further comprising:

disposing front hinges on a front of the skirt;

disposing hinge grooves in which the front hinges are rotatably coupled on the rear bezel housing; and rotating the armrest, wherein when the armrest is rotated, the front hinges are rotated in a fastened state to the hinge grooves.

14. The method of claim 12, further comprising:

disposing rear hinges on left and right sides of a rear of the skirt; and disposing guide grooves in which the rear hinges are inserted on inner surfaces of the left and right sides of the armrest board; and rotating the armrest, wherein when the armrest is rotated, the rear hinges are rotated in an inserted state in the guide grooves and moved along paths of the guide grooves.

15. The method of claim 14, wherein the rear hinges comprise:

hinge protrusions protruding left and right from the skirt; and silicon rubbers coupled to the hinge protrusions in contact with the guide grooves.

16. The method of claim 14, wherein each of the guide grooves has an S-shape of which an upper end faces a rear end of the vehicle and a lower end faces a front end of the vehicle.

17. The method of claim 14, wherein each of the guide grooves comprises a curved surface that is concave downward and convex upward.

18. The method of claim 14, wherein when the armrest is erect and accommodated in the armrest board, the skirt is erect and disposed between the lid of the armrest and an inner front surface of the armrest board facing the lid.

19. An armrest assembly for a vehicle, the armrest assembly comprising:

an armrest comprising a main body and a lid;

an armrest board to which the armrest is rotatably coupled and in which the armrest is accommodated in an erect state;

a skirt coupled to a rear bezel housing of the lid and to the armrest board and correspondingly covering a rear space of the lid when the armrest is rotated forward, wherein the skirt has a panel shape and comprises a hard material;

rear hinges disposed on left and right sides of a rear of the skirt; and guide grooves in which the rear hinges are inserted, the guide grooves being disposed on inner surfaces of left and right sides of the armrest board, wherein when the armrest is rotated, the rear hinges are rotated in an inserted state in the guide grooves and moved along paths of the guide grooves.

20. A method of operating an armrest assembly for a vehicle, the method comprising:

rotatably coupling an armrest to an armrest board in which the armrest is accommodated when in an erect state, the armrest comprising a main body and a lid;

coupling a skirt to a rear bezel housing of the lid and to the armrest board and correspondingly covering a rear space of the lid when the armrest is rotated forward, wherein the skirt has a panel shape and comprises a hard material;

disposing rear hinges on left and right sides of a rear of the skirt;

disposing guide grooves in which the rear hinges are inserted on inner surfaces of left and right sides of the armrest board; and rotating the armrest, wherein when the armrest is rotated, the rear hinges are rotated in an inserted state in the guide grooves and moved along paths of the guide grooves.

* * * * *